June 26, 1923. 1,459,771
W. J. KENT
METHOD AND MACHINE FOR FORMING SHEET TILING
Filed Aug. 12, 1922 4 Sheets-Sheet 1
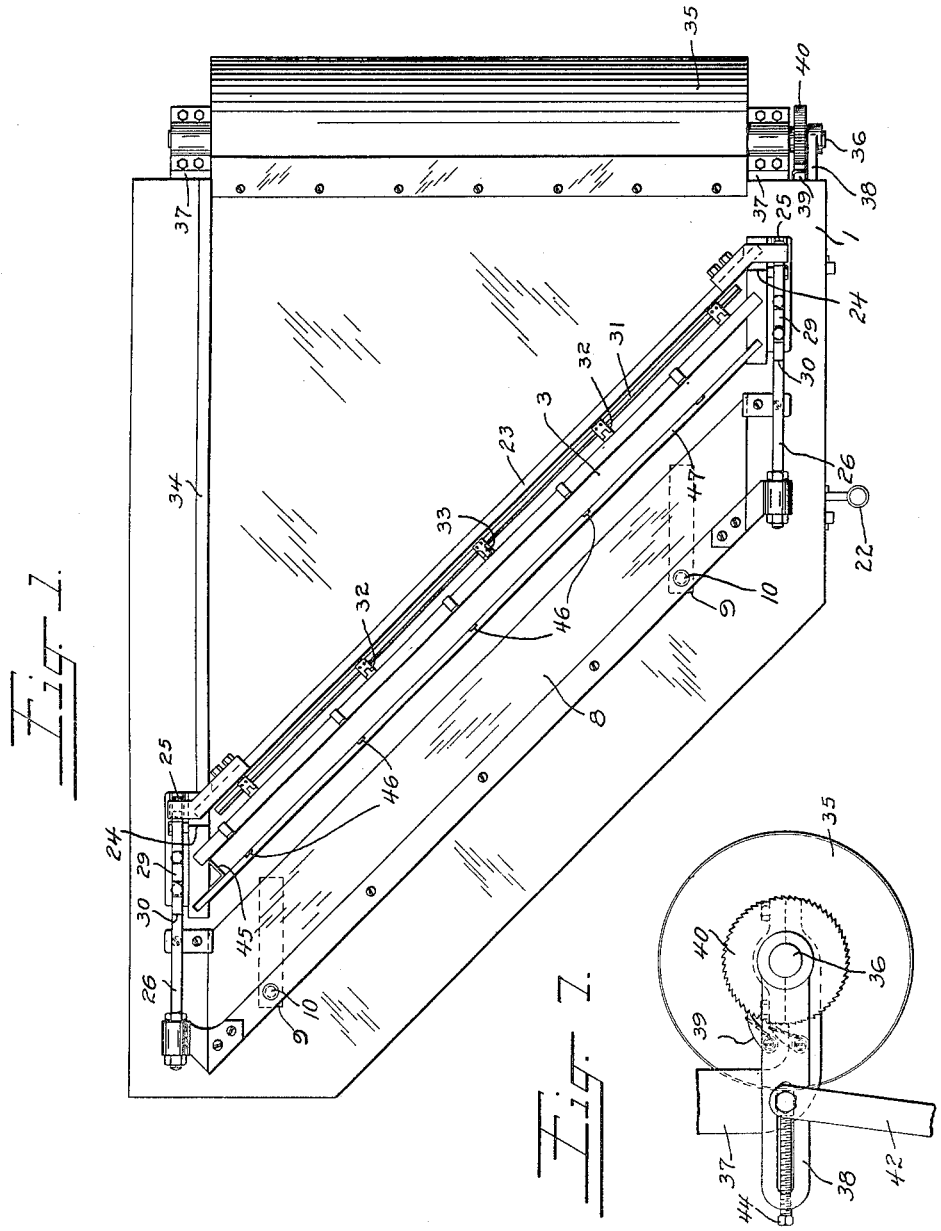
Inventor
WILLIAM J. KENT
By his Attorney
Ernest Hopkinson

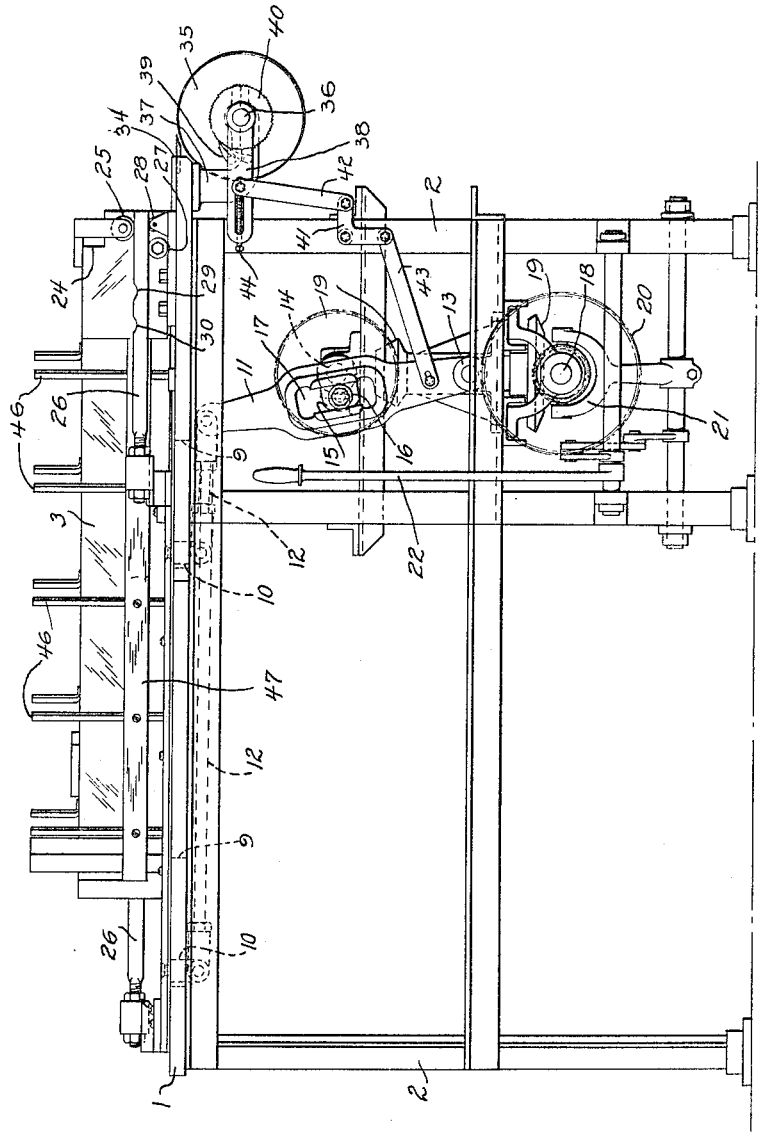

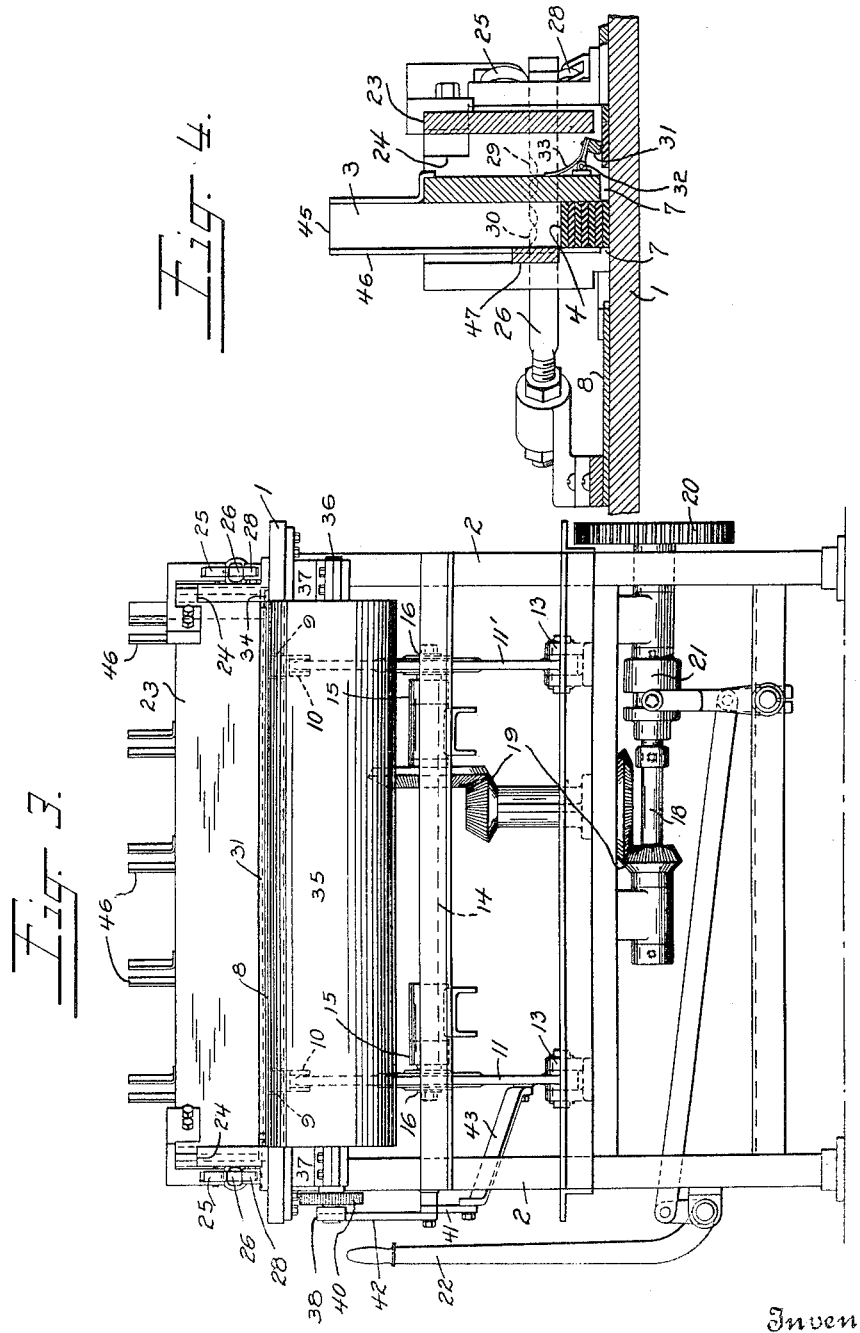

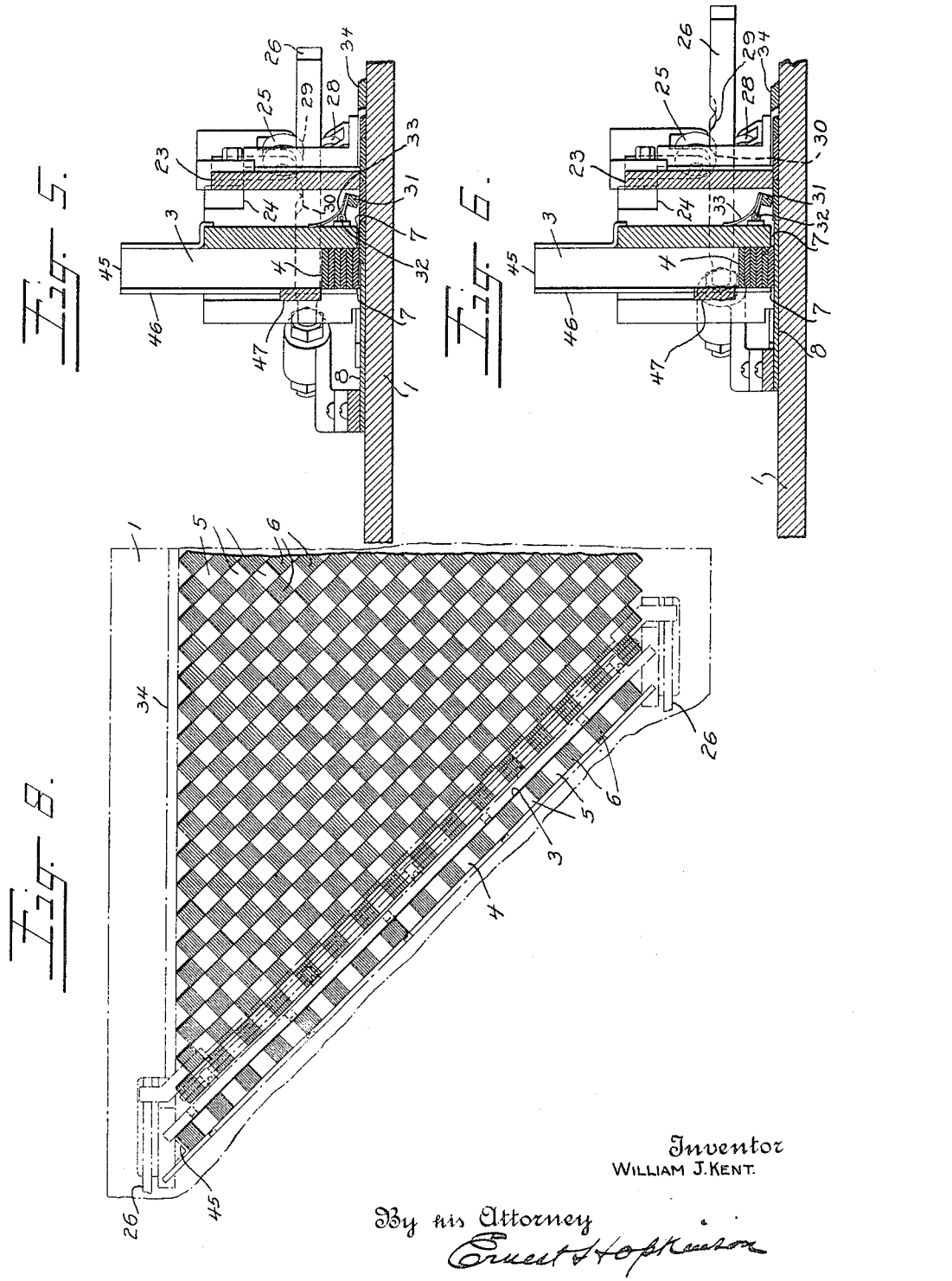

Patented June 26, 1923.

1,459,771

UNITED STATES PATENT OFFICE.

WILLIAM J. KENT, OF BROOKLYN, NEW YORK, ASSIGNOR TO THE MECHANICAL RUBBER COMPANY, A CORPORATION OF NEW JERSEY.

METHOD AND MACHINE FOR FORMING SHEET TILING.

Application filed August 12, 1922. Serial No. 581,355.

*To all whom it may concern:*

Be it known that I, WILLIAM J. KENT, a citizen of the United States, residing at Brooklyn, county of Kings, and State of New York, have invented a certain new and useful Method and Machine for Forming Sheet Tiling, of which the following is a specification.

This invention relates to a method and machine for forming sheet tiling, and has for its primary object the assembling of the parts composing the sheet as strips having their sides inclined to the sides of the sheet.

Referring to the drawings forming part of this application,

Fig. 1 is a plan view of the machine;
Fig. 2 is a side elevation of the machine;
Fig. 3 is a front elevation of the machine;
Figs. 4, 5 and 6 are enlarged detail sectional elevations of three positions of the strip feeding mechanism;
Fig. 7 is an enlarged side elevation of the feed roller and actuating mechanism therefor; and
Fig. 8 is a plan view of the machine in outline showing a portion of a sheet of tiling.

The machine comprises a table 1 supported upon a framework 2 and a magazine or source of strip supply 3 supported at one end of the table.

The material of which the sheet tiling is made is placed in the magazine in the form of relatively long strips 4 which are placed one upon another to form a stack. The strips may be cut from sheets of contrasting color, the colors being arranged alternately in the magazine thereby permitting a sheet to be formed having alternate strips. The principal purpose of the machine, however, is to form sheet tiling of blocks or squares with their sides inclined to the sides of the sheet. Therefore for this purpose the strips are formed of squares or blocks of contrasting color, illustrated by the blocks 5—6. But obviously the strips may be formed of elements of any desired contours and variety of colors. They may also be made of any suitable material as for instance from sheets of rubber compound, the sheets being differently colored to provide the desired color designs, the rubber compound being either unvulcanized, partially vulcanized or wholly vulcanized, as may be desired. The strips supplied to the magazine may also be made in any desired manner, for instance they may be formed in the manner set in my co-pending application Serial No. 504-514, filed September 30, 1921, or they may be formed in quite a similar manner by use of the present machine as will be obvious from the following description of the construction and operation of the machine.

The stack of tiling 4 is supported in the plane of the table 1 and the front and rear walls of the magazine 3 are open at their base to provide the slots 7—7 to permit the passage therethrough of a pusher bar or plate 8 and the bottommost strip of the stack which is pushed or forced by the pusher bar through the forward slot 7 and into contact with the partially formed sheet of tiling supported on the table, the slot through which the strip passes being only high enough to permit the egress of the strip while serving as a stop to prevent the adjacent strip above from being moved forward.

The pusher bar or plate 8 rests in the plane of the table 1 and is restricted to its movement through the magazine by being confined at its ends in slots 9 permitting only of a reciprocatory movement longitudinally of the table to provide for the strip ejecting operations. The plate is provided with lugs 10 depending through slots formed in the table of sufficient length to permit the required movement of the plate. These lugs are secured to arms 11—11' by means of link rods 12, the lower ends of the arms 11—11' being pivoted in brackets 13 secured to the frame 2. A shaft 14 is revolubly mounted in journals secured to the frame and has secured on each of its ends a crank 15 provided with an anti-friction roller 16. These rollers engage the walls of the slots 17 formed in the arms 11—11' intermediate their ends whereby a rotation of the shaft 14 will effect a rocking of the arms 11—11', which will in turn impart the required reciprocatory movement to the plate 8. The shaft 14 may be driven by any suitable means. In the present instance it is shown as being driven by means of the shaft 18 journalled in bearings secured to the frame and a train of gears 19 connecting the two shafts. The shaft 18 is shown provided with a gear wheel 20 which may be connected with any source of power and a clutch 21 is provided having an operating arm 22 for connecting and disconnecting the shaft 18 with the drive wheel 20.

A presser bar 23 is secured in front of the magazine 3 in slots 24 to permit an up and down movement of the bar. Rollers 25 are secured at either end of the bar and engage cam rods 26 secured at their rear ends to the plate 8 and supported at their forward ends upon the rollers 27—28. The cam rods 26 are provided with depressed surfaces 29—30 for permitting the raising or lowering of the presser bar as they move to and fro at timed intervals as will later more fully appear. A bar 31 running the length of the magazine is pivotally secured at various points to the front thereof by means of the hinge connections 32, and is held in slightly inclined spring pressed engagement with the last applied strip by means of the springs 33 so that the forward edge of the bar will press upon the strip in a manner to permit the strip to be freely advanced while preventing any accidental rearward movement thereof.

As has been previously stated the principal object of the invention is to form a sheet from relatively long strips of material having their sides inclined to the sides of the sheet and likewise where the strips are formed of squares or blocks the blocks have their sides also inclined thereby giving a diamond effect to the elements forming the sheet as clearly shown in Fig. 8. To accomplish this the magazine 3 and the attendant parts, namely, the presser bar 23, bar 31, and pusher bar or plate 8 are disposed at an inclined angle, (in the present instance at an angle of 45°), to the path of travel of the strips or what is the equivalent to the path of travel of the plate 8, as clearly shown in Figs. 1 and 8. The strips therefore leave the magazine at this inclined angle which is maintained during their entire movement along the table.

It will be observed that as the plate strikes the strip in the magazine, ejecting it therefrom, and moving it into contact with the partially formed sheet, the force applied has a tendency to move the strip in a direction at right angles to its edge, that is to say to divert it from the desired path of travel. And likewise after contact with the partially formed sheet there is a tendency to divert the sheet in a similar manner. This tendency to divert the strip would produce a relative sliding movement between the strip and ejecting plate but such movement is prevented by the frictional contact or by the adhesion (where the strips are formed of rubber, especially unvulcanized rubber, or where the strips have their contacting edge cement coated) between the strip and plate. This firm engagement of the strip with the plate also has a tendency to prevent the undesirable diversion in the travel of the partially formed sheet, as the strip when in contact with the partially formed sheet strongly adheres to it thereby transferring the action of the pusher plate to it.

As a further safeguard in insuring positive movement a side guide bar 34 is secured to the table which prevents any diverted movement of either the individual strip or the partially formed sheet by engaging the corners of the successive rows or strips, and serves as a counteracting force thereby compelling the sheet to move in the desired forward direction only.

The partially formed sheet is moved along the table by the pusher bar as the successive strips are applied, and to permit an easy movement as the sheet increases in size I prefer to provide additional means. In the present preferred embodiment a roller 35 is secured on a shaft 36, revolubly mounted in brackets 37 secured to the front of the table, the roller being in front of the table with its upper edge approximately in the plane thereof. An arm 38 is loosely mounted on one end of the shaft 36 and carries a spring pressed pawl 39 which engages a ratchet wheel 40 secured on the shaft 36, whereby a rocking of the arm 38 will impart a step by step movement to the roller. The partially formed sheet therefore as it reaches this roller and rests there upon is moved along by this step movement, that is to say its movement is assisted by the step movement of the roller which operates in conjunction with the pushing movement of the plate 8, the lineal movement of the former being equal approximately to that of the latter and being timed to be approximately concurrent therewith. This movement in the present instance is accomplished by the bell crank lever 41, conveniently secured to an upright of the frame 2, and the links 42—43 pivotally secured at either end of the lever 41. The link 42 is secured to the arm 38, and the link 43 is secured to the arm 11 whereby the forward movement of the arm 11 (this being the movement that is instrumental in carrying the plate 8 forward) effects a simultaneous advance movement of the roller 35. The link 42 is pivotally secured in a slot in the arm 38 and rendered adjustable therein by means of the screw 44 whereby, with proper adjustment in an obvious manner, the lineal movement of the roller 35 may be regulated to correspond as nearly as may be desired to that of the plate 8, and the link 43 is provided with an elongated slot in the end secured to the arm 11 to provide for a suitable amount of lost motion which is necessary in timing the movement of the roller 35 so that it will only revolve when the pusher plate begins to move the partially formed sheet as will later more clearly appear.

It is of the utmost importance when the strips composing the sheet are formed of squares or similar elements that they be successively secured to the partially formed sheet to give the perfect diamond effect. This necessitates accurate alignment of the rows of squares in all directions. This requires that each row or strip be accurately placed in the magazine and that the movement forward be free from any appreciable side movement of either the individual strip being applied or the partially formed sheet, for the least irregularity in the arrangement of the squares is very noticeable and would produce an imperfect and perhaps unsalable sheet of tiling. To accomplish the desired result great care must be taken to see that all the strips in the magazine are placed hard up against the end thereof adjacent the guide bar 34 so that as they are ejected from the magazine the corners of the strips in proximity to the bar 34 will contact therewith with the same degree of pressure throughout the entire movement along said guide. It will be obvious that a half square or block could be used to terminate this end of the respective strips, and this half square would then be the bearing surface as the strip is moved along the guide bar. But in the present instance this has not been resorted to as it has been found that it is sufficient if the corner of the strip touches the guide bar and a perfect sheet has been thus produced. To facilitate this an end wall 45 is provided in the magazine against which the ends of the respective strips in the stack firmly abut to insure their ejectment therefrom with the exactness required.

The back of the magazine is of skeleton formation so that the stack of strips may be observed at any time to make sure that they are in close contact with the end wall 45 and in the present instance is formed of the uprights 46 which are secured to the bar 47. This bar is removably engaged by slots formed in the ends of the magazine whereby it may be removed to facilitate recharging the magazine as it is of great importance that the strips be accurately stacked which by this means may be done before placing them in the magazine, for with the back of the magazine removed there is little danger of disarrangement when placing the stack in the magazine.

In operating the machine the magazine 3 is provided with a stack of the strips of rubber or other material suitably arranged so that the desired design effect will be produced upon the sheet. One or both of the longitudinal edges of the strip are provided with an adhesive such as vulcanizable rubber cement or the like so that they will adhere along their longitudinal edges when brought into contact upon the table.

The wheel 20 being connected to any desired source of power as for instance an electric motor (not shown), the arm 22 is swung to operate the clutch 21 to drive the shaft 18, and through the train of gears 19, the shaft 14. This produces a rocking of the arms 11—11', the forward movement of which carries the pusher plate 8 into the magazine 3 where it contacts with the bottommost strip and forces it out of the magazine through the forward slot 7, the cam rods 26 moving simultaneously with the plate 8.

Referring to Fig. 4 it will be noted that the rollers 25 are riding upon the top of the cam rods 26 and correspondingly the presser bar 23 is raised above the joint between the two strips that were last applied to the partially formed sheet. The plate 8 is then in its initial position ready to advance. The initial advancing movement brings the plate into contact with the bottommost strip in the magazine and forces it through the forward slot 7 as shown in Fig. 5 where it is brought into contact along its forward longitudinal edge with the sheet partially formed upon the table and firmly adheres thereto due to the coating of cement applied to the edge of the strip. During this movement the cam rods have moved forward to bring the forward depressions 29 into alignment with the rollers 25. The rollers are thereby lowered causing the presser bar 23 to rest upon and press the joint produced by the union of the two previously applied strips as clearly shown in Fig. 5. The further movement of the plate and cam rods forward effects a raising of the rollers 25 out of the depressions 29 and a raising of the presser bar 23 free from the sheet of tiling. At this point the further swing of the arm 11 begins to revolve the roller 35, due to the slot connection of the link 43, and this movement in conjunction with the further movement of the plate 8 carries the sheet forward until the plate has reached its extreme forward position.

When the plate 8 and the cam rods have reached their extreme forward movement the depressions 30 will have advanced into alignment with the rollers 25 thereby lowering the rollers and consequently the presser bar 23 which latter will then strike upon and press, seal, and smooth down the newly formed joint as shown in Fig. 6. The rocker arms 11—11' then begin to swing rearwardly and to carry with them the pusher plate 8 and the cam rods 26. This causes raising of the presser bar 23 which drops again upon the joint when the rearward movement brings the depressions 29 into alignment with the rollers 25, the joints being thus well pressed together by the repeated action of the presser bar 23 and the pressure applied by the pusher plate 8. During the rearward movement of the pusher plate any tendency there might be of the last strip moving back with the pusher plate 8 on account of the adhesive that might be present on their contacting edges or otherwise is prevented by the spring pressed bar 31.

As the shaft 14 rotates continuously the cycle of operations just described is continuously repeated until a sheet of any desired length is produced. The sheet thus formed if made of unvulcanized or partially vulcanized rubber having the blocks or squares joined by vulcanizable cement may then be finally vulcanized in any desired manner.

As many apparently widely different embodiments of this invention may be made without departing from the spirit thereof, it is to be understood that I do not intend to limit myself to the specific form of the invention as set forth except as indicated in the appended claims.

Having thus described my invention what I claim and desire to protect by Letters Patent is:

1. A machine for forming sheets from relatively long strips of material which comprises a table along which the strips and sheet are moved in a definite path in the formation of the sheet, a supply magazine set at an inclined angle to said path for supporting a stack of strips with their longitudinal edges at said inclined angle, a pusher device set at said inclined angle for engaging the successive strips of the stack, and means for moving said pusher device in said path for applying said strips to the partially formed sheet upon the table.

2. A machine for forming sheets from relatively long strips of material which comprises a table along which the strips and sheets are moved in a definite path in the formation of the sheet, a supply magazine set at an inclined angle to said path for supporting a stack of strips with their longitudinal edges at said inclined angle, a pusher device set at said inclined angle for engaging the successive strips of the stack, means for moving said pusher device in said path for applying said strips to the partially formed sheet upon the table, and means for pressing upon the sheet directly over the joints between the strips.

3. A machine for forming sheets from relatively long strips of material which comprises a table along which the strips and sheet are moved in a definite path in the formation of the sheet, a supply magazine set at an inclined angle to said path for supporting a stack of strips with their longitudinal edges at said inclined angle, a pusher device set at said inclined angle for engaging the successive strips of the stack, means for moving said pusher device in said path for applying said strips to the partially formed sheet upon the table, means for momentarily pressing upon the sheet directly over the joint between the strips, and means for repeating the pressure previous to another strip being applied.

4. A machine for forming sheets from relatively long strips of material which comprises a table along which the strips and sheet are moved in a definite path in the formation of the sheet, a supply magazine set at an inclined angle to said path for supporting a stack of strips with their longitudinal edges at said inclined angle, a pusher device set at said inclined angle for engaging the successive strips of the stack, means for moving said pusher device in said path for applying said strips to the partially formed sheet upon the table, and a side guide for preventing diverted movement from said path of the strips and partially formed sheet.

5. A machine for forming sheets from relatively long strips of material which comprises a table along which the strips and sheet are moved in a definite path in the formation of the sheet, a supply magazine set at an inclined angle to said path for supporting a stack of strips with their longitudinal edges at said inclined angle, a pusher device set at said inclined angle for engaging the successive strips of the stack, means for moving said pusher device in said path for applying said strips to the partially formed sheet upon the table, a roller for moving said sheet along said path, and means for operating the roller.

6. A machine for forming sheets from relatively long strips of material which comprises a table along which the strips and sheet are moved in a definite path in the formation of the sheet, a supply magazine set at an inclined angle to said path for supporting a stack of strips with their longitudinal edges at said inclined angle, a pusher device set at said inclined angle for engaging the successive strips of the stack, means for moving said pusher device in said path for applying said strips to the partially formed sheet upon the table, and means for preventing rearward movement of the last applied strip when the pusher device returns to normal position.

7. A method of making sheets from strips of material having their longitudinal edges inclined to the edges of the sheet, said strips having a longitudinal edge thereof coated with an adhesive to permit contacting edges of adjacent strips to adhere together, comprising bringing the strips successively into contact along their longitudinal edges with the partially formed sheet by moving the strips in a path inclined to the edges of the strips by the simultaneous application of pressure along a longitudinal edge of the respective strips and a counteracting force preventing divergence from said path.

Signed at New York, county of New York and State of New York, this 9th day of August 1922.

WILLIAM J. KENT.